United States Patent [19]
Kamlet et al.

[11] 3,878,004
[45] Apr. 15, 1975

[54] POLYMERIZATION PROCESS FOR MAKING NITRO COMPOUNDS, USEFUL AS EXPLOSIVES

[75] Inventors: Mortimer J. Kamlet, Silver Spring, Md.; Richard R. Minesinger, Berrien Springs, Mich.

[73] Assignee: The United States of America as represented by the Secretary of the Navy, Washington, D.C.

[22] Filed: Mar. 13, 1972

[21] Appl. No.: 233,837

[52] U.S. Cl. .............................. 149/88; 260/348 R
[51] Int. Cl. ............................................ C06b 3/00
[58] Field of Search .................... 149/88; 260/348 R

[56] References Cited
UNITED STATES PATENTS
3,642,830   2/1972   Frankel et al. ................... 149/88 X Primary Examiner—Leland A. Sebastian
Attorney, Agent, or Firm—R. S. Sciascia; J. A. Cooke

[57] ABSTRACT

An improved method of preparing a polymer which is the reaction product of 4,4-dinitropimeloyl chloride and 2,2,8,8-tetranitro-4,6-dioxa-1,9-nonanediol which is then reacted with 1,1,1-trimethylolpropane comprising conducting said polymerizations in the presence of a solvent, 1,2-dichloroethane.

6 Claims, No Drawings

POLYMERIZATION PROCESS FOR MAKING NITRO COMPOUNDS, USEFUL AS EXPLOSIVES

BACKGROUND OF THE INVENTION

This invention relates generally to highly energetic polymers which can be used in explosive compositions and more particularly to the reaction product of 4,4-dinitropimeloyl chloride and 2,2,8,8-tetranitro-4,6-dioxa-1,9-nonanediol which is then reacted with 1,1,1-trimethylolpropane to yield the desired polymer.

Energetic polymers similar in composition to those disclosed and claimed in application Ser. No. 524,973, filed Feb. 2, 1966, now U.S. Pat. No. 3,745,076, entitled CHEMICAL by Darrell V. Sickman, Mortimer J. Kamlet, Richard D. Rich, Harry Heller and Lloyd A. Kaplan, are useful as binders in high explosive compositions. These polymers can be made from energetic acid chlorides and diols reacted together to give acid chloride terminated prepolymers. These prepolymers are then reacted with triols in a combination endcapping and chain extension reaction to give the desired hydroxy terminated polyesters. A preferred combination is the product which is reaction product of 4,4-dinitropimeloyl chloride and 2,2,8,8-tetranitro-4,6-dioxa-1,9-nonanediol which is then condensed with 1,1,1-trimethylolpropane to form the desired hydroxy terminated polymer. These polymers can then be cross-linked with diisocyanates in the presence of energetic plasticizers and solid high explosives to give plastic bonded explosives with many useful properties.

The process described in said patent application, which is hereby incorporated by reference, for the manufacture of polymers is briefly as follows: The acid chloride and diol are heated as a melt to 100°–130°C for several hours until HCl evolution ceases. Energetic plasticizer is then added along with the triol and heating is again resumed until HCl evolution ceases.

The original process however, creates hazards to equipment and personnel because it requires the heating of undiluted, reacting, high energy, materials to the required temperatures, i.e., handling a reaction mixture more energetic than TNT at elevated temperatures. Furthermore, this process suffers from the fact that premature cross-linking during the reaction of acid chloride terminated prepolymer and triol have been observed.

Subsequent modification of the above process (not claimed or disclosed in said patent application) was made by using inert diluents, such as heptane, above the reactants to act as a heat sink for temperature control. However, the use of inert diluents has not proven to be satisfactory since it suffers from the fact that unpredictable instances of premature cross-linking during the reaction of acid chloride terminated prepolymer and triol have been observed. Such instances, which also occur in the original process would result in the loss of large quantities of materials and labor if these processes were used on an industrial scacle.

Thus, research has gone on to attempt to find a method of preparing such polymers and more particularly, to a method of preparing the preferred polymer hereinbefore described which does not have the above-cited shortcomings.

SUMMARY OF THE INVENTION

Accordingly an object of this invention is to provide a method for preparing a polymer.

Another object of this invention is to provide a method for preparing a polymer which is the reaction product of 1,1,1-trimethylolpropane and the condensation product of 4,4-dinitropimeloyl chloride and 2,2,8,8-tetranitro-4,6-dioxa-1,9-nonanediol which can be used in explosive compositions.

Yet another object of this invention is to provide a method of preparing the highly energetic polymer hereinbefore named which is relatively safe.

A further object of this invention is to provide a method of preparing the highly energetic polymer hereinbefore named which does not result in premature cross-linking.

A still further object of this invention is to provide a method for the preparation of the hereinbefore named polymer which yields a product that has readily reproducible physical and chemical properties, e.g., viscosity and molecular weight.

These and other objects of this invention are accomplished by providing a method of preparing the polymer which is the condensation product of 1,1,1-trimethylolpropane and the reaction product of 4,4-dinitropimeloyl chloride and 2,2,8,8-tetranitro-4,6-dioxa-1,9-nonanediol in a particular solvent, 1,2-dichloroethane.

DESCRIPTION OF THE PREFERRED EMBODIMENT

The process of this invention involves the reaction of an energetic acid chloride, 4,4-dinitropimeloyl chloride and a diol, 2,3,8,8-tetranitro-4,6-dioxa-1,9-nonanediol in the presence of a solvent, 1,2-dichloroethane. The 1,2-dichloroethane has been found to maintain fluidity and temperature control in the first step of the process and generally to overcome all the other shortcomings hereinbefore enumerated. After HCl evolution is complete, a large amount of 1,2-dichloroethane (and energetic plasticizer if desired) is added and the solution is added and the solution is heated (if necessary) until it is clear. Then the triol,1,1,1-trimethylolpropane is added and the reaction is carried to completion at reflux. The effect of the refluxing solvent is to provide temperature control, to decrease viscosity, and to provide dilution of the reacting high energy materials. The solvent is then stripped off under vacuum leaving the viscous polymer-plasticizer mixture. If energetic plasticizer was not used in the polymerization procedure it can be added just before the solvent is stripped off. In effect, this process gives a practical way to make a high useful material which had heretofore been inaccessible for lack of such a process. Scale-ups of this process have consistently been more successful and reproducible in terms of viscosity and average molecular weight than the earlier process.

The general nature of the invention having been set forth, the following example is presented as a specific illustration thereof. It will be understood that the invention is not limited to this specific example but is susceptible to various modifications that will be recognized by one of ordinary skill in the art.

EXAMPLE

A 2 liter, 3-necked, round-bottom flask is fitted with a gas-tight mechanical stirrer, thermometer, nitrogen inlet, and reflux condenser and is dried thoroughly by heating while purging with nitrogen. To the flask is added 60.3g (0.21 mole) 4,4-dinitropimeloyl chloride, 48.1g (0.14 mole) 2,2,8,8-tetranitro-4,6-dioxa-1,9-nonanediol and 22 ml 1,2-dichloroethane. Glass tubing is led from the top of the condenser to a gas bubbler immersed in water. Thus, the HCl evolved during the reaction can be swept through with nitrogen and titrated with standard NaOH. The reaction flask is then heated with an oil bath until the reactants melt and are well mixed by stirring. Heating is continued to a bath temperature of 115°–120°C for 5 hours. The amount of HCl usually titrated is 95–99% of theory.

The oil bath is lowered and 625ml of 1,2-dichloroethane and 207.6 g of plasticizer, bis(2,2-dinitro-2-fluoroethyl) formal is added. Heat is applied, if necessary, to achieve a clear solution.

When the temperature of the solution is below 60°C, 10.7g (0.08 mole) of 1,1,1-trimethylolpropane is added. The solution is stirred vigorously, purged with nitrogen, and heated to reflux for 2 hours. The normal amount of HCl titrated for this step is 95–99% of theory.

The clear solution is filtered, if necessary, transferred to a rotary evaporation and the solvent removed under vacuum (0.5–1mm Hg) at 30°–40°C. The light straw yellow, viscous liquid which remains is stored at −10°C until used.

In the first step of this process, the reaction of the acid chloride and the diol, the solvent need not be present in very large quantities. Thus, the weight percent of 1,2-dichloroethane that is preferably used in this step is about 7–50 weight percent of the entire mixture of reactants and solvent with a range of about 15–30 weight percent being most preferred. In the second step, wherein the triol is added to the reaction product of the diol and the acid chloride a larger amount of solvent is preferred. Thus, in this step the 1,2-dichloroethane preferably constitutes about 50–98 weight percent of the entire mixture of solvents plus all reactants (the diol-acid chloride addition product plus the triol) with a range of about 80–95 weight percent being most preferred.

We claim:

1. In the method of polymerizing 4,4-dinitropimeloyl chloride and 2,2,8,8-tetranitro-4,6-dioxa-1,9-nonanediol the improvement comprising carrying out said polymerization in 1,2-dichloroethane as solvent.

2. In the improvement of claim 1 the further improvement comprising using a quantity of 1,2-dichloroethane as solvent such that said 1,2-dichloroethane constitutes 7–50 weight percent of the entire reaction mixture.

3. In the method of polymerizing 1,1,1-trimethylolpropane and the reaction product of 4,4-dinitropimeloyl chloride and 2,2,8,8-tetranitro-4,6-dioxa-1,9-nonanediol the improvement comprising carrying out said polymerizing in the presence of 1,2-dichloroethane as solvent.

4. In the improvement of claim 3 the further improvement comprising using a quantity of 1,2-dichloroethane as solvent such that said 1,2-dichloroethane constitutes 50–98 weight percent of the entire reaction mixture.

5. In the method of polymerizing 4,4-dinitropimeloyl chloride and 2,2,8,8-tetranitro-4,6-dioxa-1,9-nonanediol and then further reacting the product thereby obtained with 1,1,1-trimethylol-propane the improvement comprising conducting both reactions in the presence of 1,2-dichloroethane as solvent.

6. In the improvement of claim 5 the further improvement comprising using a quantity of 1,2-dichloroethane as solvent in said first step such that said 1,2-dichloroethane constitutes 7–50 weight percent of the entire reaction mixture and using a quantity of 1,2-dichloroethane as solvent in said second step such that said 1,2-dichloroethane constitutes 50–98 weight percent of the entire reaction mixture.

* * * * *